United States Patent
Kimura

[15] 3,657,665
[45] Apr. 18, 1972

[54] AUTOMATIC FREQUENCY CONTROL SYSTEM WITH MEMORY CIRCUIT FOR INCREASING CONTROL RANGE

[72] Inventor: Kenji Kimura, Tokyo, Japan

[73] Assignee: Shiba Electric Co., Ltd., Tokyo, Japan

[22] Filed: Nov. 10, 1970

[21] Appl. No.: 88,263

[30] Foreign Application Priority Data

Nov. 13, 1969 Japan....................................44/90455

[52] U.S. Cl.......................................331/17, 331/18, 331/26
[51] Int. Cl...........................................................H03b 3/04
[58] Field of Search..................................331/17, 18, 25, 26

[56] References Cited

UNITED STATES PATENTS 3,337,813 8/1967 Graeve....................................331/17

*Primary Examiner*—Roy Lake
*Assistant Examiner*—Siegfried H. Grimm
*Attorney*—Chittick, Pfund, Birch, Samuels & Gauthier

[57] ABSTRACT

An automatic frequency control system has a phase comparator for comparing the phases of a sawtooth wave of a reference frequency and the output frequency of an oscillator and a memory circuit for descriminating or detecting the polarity of the phase difference from two kinds of stepped waveforms generated by the phase comparator in response to the polarity of the phase difference and for storing a DC analog potential in response to the detected polarity. The frequency of the oscillator is controlled by this DC analog potential.

5 Claims, 8 Drawing Figures

*INVENTOR.*
KENJI KIMURA
BY
Chittick, Pfund, Birch, Samuels & Gauthier
ATTORNEYS

INVENTOR.
KENJI KIMURA

BY
Chittick Pfund Birch Samuels & Gauthier
ATTORNEYS

INVENTOR.
KENJI KIMURA

BY
Chittick, Pound, Birch, Samuels & Gauthier
ATTORNEYS

AUTOMATIC FREQUENCY CONTROL SYSTEM WITH MEMORY CIRCUIT FOR INCREASING CONTROL RANGE

BACKGROUND OF THE INVENTION

The present invention relates to an automatic frequency control system (AFC) and more particularly a novel automatic frequency control system which may automatically synchronize a frequency of an oscillator with a fixed reference frequency.

The prior art automatic frequency control system illustrated in FIG. 1 comprises generally a sawtooth wave generator 1, a phase comparator 2, a phase correcting integrator 3 and an oscillator 4. The phase comparator 2, the phase correcting integrator 3 and the oscillator 4 constitute a feedback loop circuit and the output frequency $f_o$ of the oscillator 4 is so controlled as to synchronize with the frequency of input signal, that is the reference signal of the sawtooth wave generator 1. In this case, the output frequency $f_o$ of the oscillator 4 is compared with the output frequency $f_{sr}$ of the sawtooth wave generator 1 in synchronism with the frequency of the reference signal in the phase comparator 2 so that the signal in proportion to the phase difference between the frequencies $f_o$ and $f_{sr}$ is fed into the phase correcting integrator 3, which in turn generates a linear analog signal in proportion to the phase-difference signal to thereby control the oscillator 4.

In the prior art system of the type described when the difference between the output frequency $f_o$ of the oscillator 4 and the reference frequency $f_r$ (that is, the output frequency $f_{sr}$ of the sawtooth wave generator 1) is not so great, the phase correcting integrator 3 may generate a linear analog signal in proportion to the difference of these two frequencies $f_o$ and $f_r$. However when the difference is increased, the oscillator 4 cannot oscillate on the correct frequency. In general the phase correcting integrator 3 generates the output which is the mean value of the input so that when the frequency difference $|f_o-f_r|$ is great a linear analog voltage precisely in response with this frequency difference is not obtained. In consequence the range of control of the oscillator 4 cannot be increased and the drawing operation range becomes smaller.

SUMMARY OF THE INVENTION

It is therefore one of the objects of the present invention to provide a novel automatic frequency control system provided with a memory means for storing the polarity of the output from a phase comparator so as to control an oscillator to oscillate on the correct frequency even when the output frequency of the oscillator has drifted greatly from a reference frequency.

Another object of the present invention is to provide a novel memory circuit (for use in an automatic frequency control system) which detects or descriminates the positive or negative polarity of the output from a phase comparator with respect to a reference level and stores the output as a DC potential lever for controlling the control grid of the oscillator.

Another object of the present invention is to provide an automatic frequency control system whose drawing time (the time interval required for correcting the drifted frequency of an oscillator to a reference frequency) may be arbitarily controlled.

Another object of the present invention is to provide a novel automatic frequency control system especially adapted for use in a system in which the output of an oscillator is used as a signal source for a rotary machine such as an electric motor or the like.

The present invention will become more apparent from the following description of the preferred embodiment thereof taken in conjunction with the accompanying drawing.

DESCRIPTION OF THE PREFERRED EMBODIMENT

Figure 1:
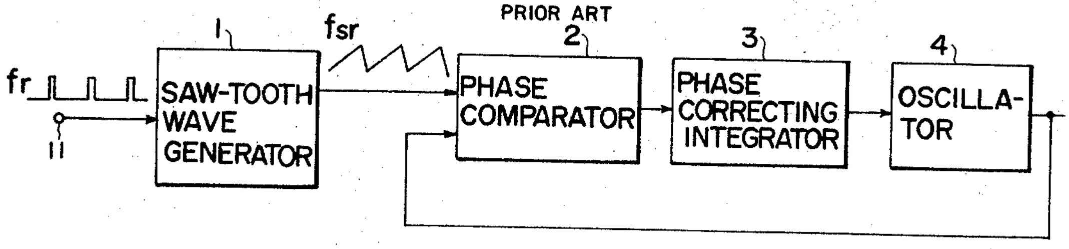
FIG. 1 is a block diagram of the prior art automatic frequency control system.
Figure 2:
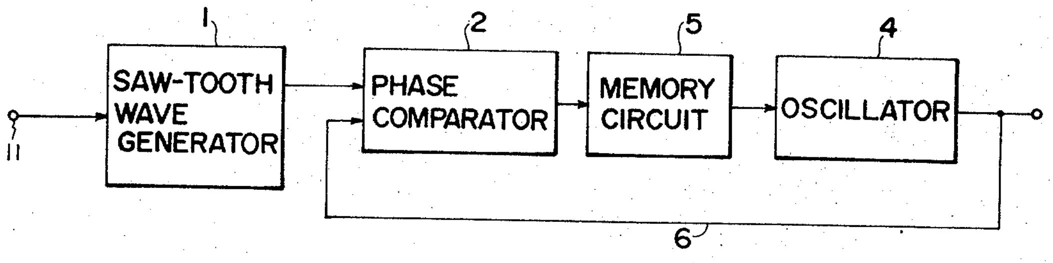
FIG. 2 is a block diagram of an automatic frequency control system in accordance with the present invention.
Figure 3:
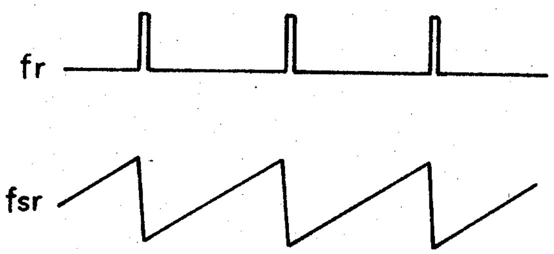
FIG. 3 is a graph illustrating the waveforms of a reference signal and the output of a sawtooth wave generator.

FIG. 2 is a block diagram of a preferred embodiment of the present invention, in which the same parts as those in FIG. 1 are designated by the same reference numerals. As viewed from FIG. 2, the output of the phase comparator 2 to which is applied the output $f_{sr}$ of the sawtooth wave generator 1 is fed into a memory circuit 5 for controlling the oscillator 4. As with the prior art AFC system the feedback of the output of the oscillator 4 to the phase comparator 4 through a route 6 is provided.

Figure 4:
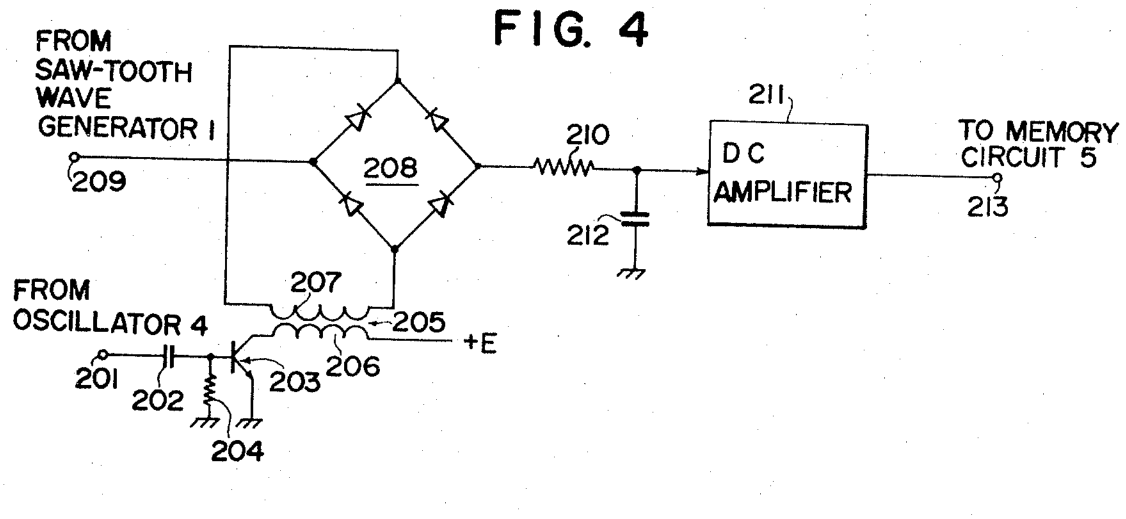
FIG. 4 is a circuit diagram of a conventional phase comparator employed in the present invention.

The sawtooth wave generator 1 as well as the phase comparator 2 are of the conventional type, but they will be described in brief for facilitating the understanding of the present invention. When the reference signal $f_r$ indicated in FIG. 1 is supplied to the input terminal 11 of the sawtooth wave generator 1, the sawtooth wave signal $f_{sr}$ in synchronism with each of the pulses of the reference signal $f_r$ is generated. The phase difference between the sawtooth wave $f_{sr}$ and the output frequency $f_o$ of the oscillator 4 is detected by the phase comparator 2 so that the latter generates an analog signal in response to the phase difference detected. One example of the phase comparator 2 is illustrated in FIG. 4. A terminal 201 is the terminal to which is applied the output $f_o$ of the oscillator 4 through the feedback route 6. The terminal 201 is connected to the base of an NPN-transistor 203 through a capacitor 202; the base being grounded through a resistor 204. The emitter of the transistor 203 is also grounded while the collector is connected to an electric source +E through a primary 206 of a transformer 205. Both ends of the secondary 207 of the transforer 205 are connected to the opposing terminals of a diode bridge 208. The sawtooth wave signal $f_{sr}$ from the sawtooth wave generator 1 is applied to an input terminal 209 of the bridge 208 while its output terminal is connected to a DC amplifier 211 through a resistor 210. The joint between the resistor 210 and the DC amplifier 211 is grounded through a capacitor 212. The output terminal 213 of the DC amplifier 211 is connected to the memory circuit 5 to be described in more detail hereinafter.

Figure 5:
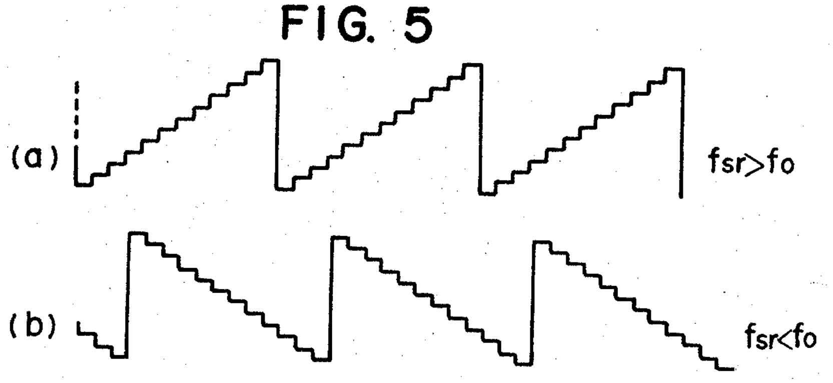
FIG. 5 is a graph illustrating the waveforms of the output thereof.

When the output $f_o$ of the oscillator is applied to the terminal 201, it flows through the primary 206 of the transformer so that a pulse voltage having a sufficiently narrow width is induced through the secondary 207 in response to the frequency of the sawtooth wave. This pulse voltage is applied across the diode bridge 208 so that the latter is rendered into conduction only during the pulse duration whereby the sawtooth wave applied to the input terminal 209 may be sampled. The sampled voltage may be stored on the capacitor 212 through the resistor 210. In consequence when there is a difference between the frequency of the oscillator 4 and that of the sawtooth wave the voltage across the capacitor 212 is increased or decreased in stepwise. This voltage may be amplified by the DC amplifier 211. Thus when $f_{sr}>f_o$, the output of the phase comparator 2 becomes the waveform increasing in stepwise as indicated in FIG. 5(a). The period is $1/(f_{sr}-f_o)$ sec. On the other hand when $f_{sr}<f_o$, the waveform decreasing in stepwise with the period of $1/(f_o-f_{sr})$ sec. is obtained as indicated in FIG. 5(b). The mode of operation described above is that of the conventional phase comparator.

Figure 6:
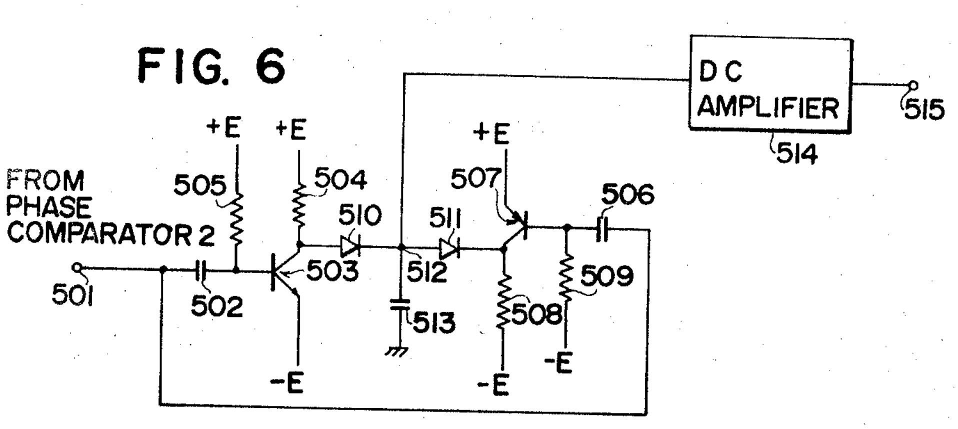
FIG. 6 is a circuit diagram of one embodiment of a memory circuit in accordance with the present invention.

The waveform shown in FIG. 5(a) and (b) are fed into the memory circuit 5, one example of which is illustrated in FIG. 6. The memory circuit 5 used in the present invention has the function of converting the analog signal from the phase comparator 2 into a digital signal, storing a number of pulses of this digital signal in a capacitor and controlling the oscillator 4 by the voltage stored across the capacitor. The output of the phase comparator 2 is applied to an input terminal 501 which is connected through a capacitor 502 to the base of an NPN-transistor 503. The collector of the transistor 503 is connected to a positive electric source +E through a resistor 504 while the emitter is connected to a negative electric source −E. The joint between the capacitor 502 and the base of the transistor 503 is connected to a positive electric source +E through a resistor 505. The capacitor 502 and resistor 505 constitute a differentiating circuit. A series circuit consisting of two diodes 510 and 511 is interconnected between the collectors of the transistor 503 and 507. These diodes 510 and 511 are forward-directed from the collector of the transistor 503 to that of the transistor 507. A memory capacitor 513 has its one terminal grounded and the other end connected to the joint 512 between the diodes 510 and 511. The joint 512 is also connected to a DC amplifier 514 having an output terminal 515 connected to the oscillator 4.

Figure 7:
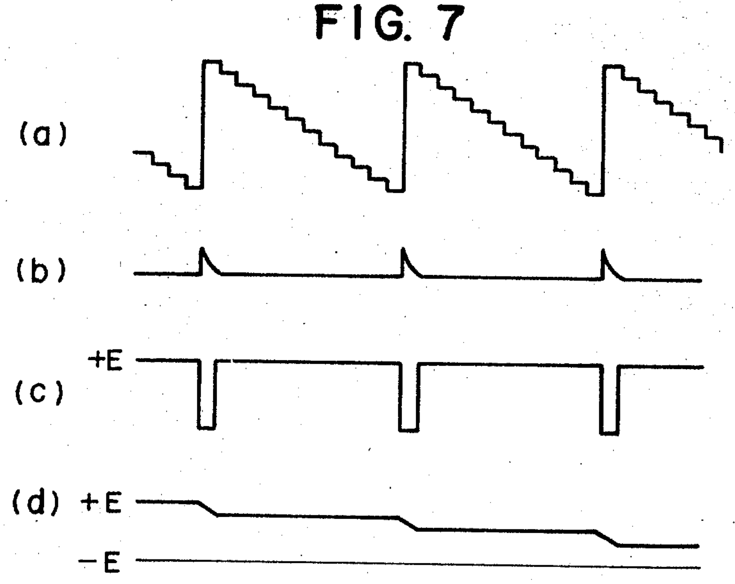
FIG. 7 is a graph illustrating the various waveforms of the components of the automatic frequency control system in accordance with the present invention for explanation of the mode of operation thereof when the frequency of the oscillator is higher than a reference frequency.
Figure 8:
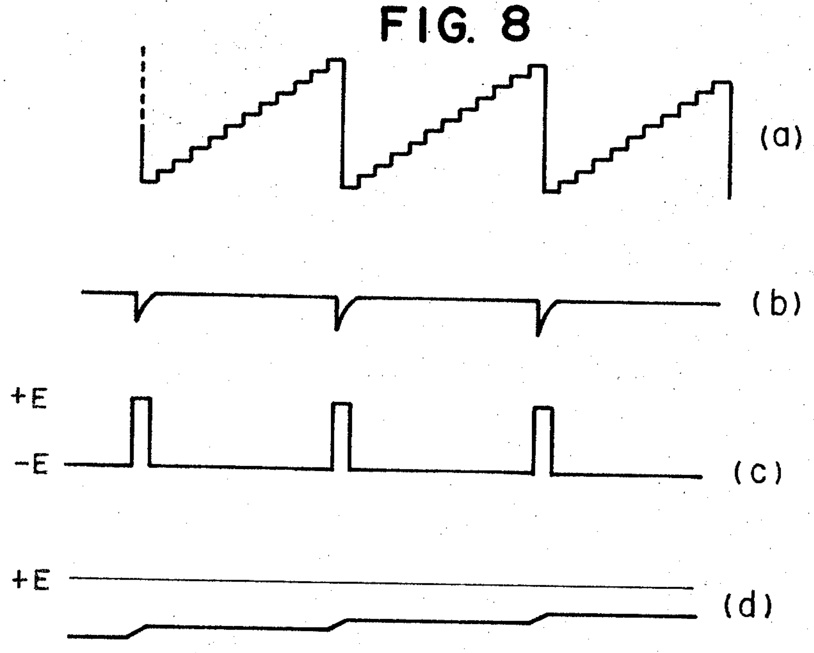
FIG. 8 is a graph similar to FIG. 7 but when the frequency of the oscillator is lower than the reference frequency.

Next the mode of operation of the memory circuit 5 will be described hereinafter with reference to FIG. 6, 7, and 8. When the frequency $f_{sr}$ of the sawtooth wave is smaller than the frequency $f_o$ of the oscillator 4, that is when the waveform indicated in FIG. 5(b) is applied to the input terminal 501 of the memory circuit 5, the waveform indicated in FIG. 7(a) is differentiated by the differentiating circuit of the capacitor 506 and the resistor 509 as indicated in FIG. 7(b). The differentiated waveform (See FIG. 7(b)) cuts off the transistor 507 so that the pulse waveform with an amplitude −E indicated in FIG. 7(c) is derived from the collector of the transistor 507. Upon generation of the negative pulse, the capacitor 513 is charged through the resistor 508 and the diode 511 by the electric source −E. Thus as the stepwise waveform is generated from the phase comparator 2, the negative potential of the capacitor 513 is increased as indicated in FIG. 7(d). The negative potential is amplified by the DC amplifier 514 and the output voltage of the amplifier 514 is fed to the oscillator 4 through the terminal 515 so as to decrease the frequency $f_o$ of the oscillator 4. The pulse differentiated by the differentiating circuit of the capacitor 502 and the resistor 505 triggers the transistor 503 into conduction so that no pulse is derived from the collector of the transistor 503.

When the frequency $f_{sr}$ of the sawtooth waveform is greater than the frequency $f_o$ of the oscillator 4, that is when the stepwise waveform indicated in FIG. 5(a) is fed to the input terminal 501 of the memory 5, this waveform (See FIG. 8(a)) is differentiated by the differentiating circuit of the capacitor 502 and the resistor 505 so that the differentiated positive pulse as viewed from FIG. 8(b) is fed into the base of the transistor 503. In consequence the transistor 503 is cut off so that the positive pulse as viewed from FIG. 8(c) is derived from the collector of the transistor 503. Thus the positive potential (+E) is charged on the capacitor 513 through the resistor 504 and the diode 510. The charged potential is increased in stepwise as indicated in FIG. 8(d) as the stepwise waveform is derived from the phase comparator 2, and is amplified by the DC amplifier 514. The output of the amplifier 514 controls the oscillator 4 so as to decrease the frequency $f_o$.

As described hereinabove when there is a frequency difference between the frequency $f_{sr}$ of the sawtooth waveform from the sawtooth wave generator and the frequency $f_o$ of the oscillator when the former $f_{sr}$ is sampled by the latter $f_o$, either of the two types of waveforms increasing and decreasing in stepwise may be derived from the conventional phase comparator and the output of the comparator is differentiated so that a voltage corresponding to a number of differentiated pulses is stored. Thus the oscillator may be so controlled by the stored voltage that $f_{sr}=f_o$. It is seen that the DC analog control signal precisely in proportion to the frequency difference may be derived even when the frequency of the oscillator is greatly drifted from the reference frequency.

It is seen that according to the present invention an automatic frequency control system having a wide drawing range may be provided. By suitably selecting the values of the capacitors 502 and 506 and the resistors 505 and 509 in the memory circuit the width of the differentiated pulse may be varied so that the drawing time may be arbitrarily selected.

What is claimed is:

1. An automatic frequency control system comprising a reference signal source, an oscillator so controlled as to synchronize with the reference frequency of said reference signal source, a sawtooth wave generator responsive to said reference signal source for generating a sawtooth wave in synchronism with said reference frequency, a phase comparator for comparing the phases of said sawtooth wave and the output of said oscillator and generating a phased waveform with period inversely related to the frequency difference of said sawtooth wave and said oscillator, and a memory circuit for detecting the polarity of said phased waveform and storing a DC potential by sampling at each said period in accordance with said detected polarity whereby said stored DC potential of said memory circuit may control the frequency of said oscillator without periodic change in said oscillator frequency.

2. An automatic frequency control system as specified in claim 1 wherein said memory circuit comprises a first detecting means for detecting the positive polarity of said waveform generated by said phase comparator, a second detecting means for detecting the negative polarity of said waveform generated by said phase comparator, and memory means for storing as said DC potential either of said detected polarities.

3. Apparatus as specified in claim 2 wherein said first detecting means comprises a differentiating circuit comprising a resistor and a capacitor and a PNP-transistor whose base is connected to said differentiating circuit; and said second detection means comprises a differentiating circuit comprising a resistor and a capacitor and an NPN-transistor whose base is connected to said second mentioned differentiating circuit.

4. Apparatus as specified in claim 1 having said memory circuit comprising a first differentiating circuit whose one terminal is connected to an input terminal, a PNP-transistor whose base is connected to the other terminal of said first differentiating circuit, a second differentiating circuit whose one terminal is connected to an input terminal, an NPN-transistor whose base is connected to the other terminal of said second differentiating circuit, a first diode whose positive terminal is connected to the collector of said NPN-transistor, a second diode whose negative terminal is connected to the collector of said PNP-transistor, and a capacitor whose one terminal is connected to the joint, formed by the connection of the negative terminal of said first diode and the positive terminal of said second diode and whose other terminal is grounded.

5. Apparatus as specified in claim 4 wherein said first and second differentiating circuits have variable time constants respectively.

* * * * *